US012065849B2

(12) United States Patent
Garcia

(10) Patent No.: US 12,065,849 B2
(45) Date of Patent: Aug. 20, 2024

(54) IN-GROUND NICHE

(71) Applicant: Columbarium By Design, LLC, Golden, CO (US)

(72) Inventor: Gerardo G. Garcia, Golden, CO (US)

(73) Assignee: COLUMBARIUM BY DESIGN, LLC, Golden, CO (US)

( * ) Notice: Subject to any disclaimer, the term of this patent is extended or adjusted under 35 U.S.C. 154(b) by 199 days.

(21) Appl. No.: 17/366,828

(22) Filed: Jul. 2, 2021

(65) Prior Publication Data

US 2023/0003048 A1 Jan. 5, 2023

(51) Int. Cl.
*E04H 13/00* (2006.01)
*A61G 17/08* (2006.01)

(52) U.S. Cl.
CPC .......... *E04H 13/008* (2013.01); *A61G 17/08* (2013.01)

(58) Field of Classification Search
CPC ..... E04H 13/001; E04H 13/008; E04H 13/00; A61G 17/08
USPC .......................................................... 52/136
See application file for complete search history.

(56) References Cited

U.S. PATENT DOCUMENTS 2,814,942 A * 12/1957 Sinner .................. E04H 13/006 52/379
3,596,419 A * 8/1971 Jalbert .................. E04H 13/00 52/21
5,419,091 A * 5/1995 Roberts ................ E04H 13/006 52/509
5,647,108 A * 7/1997 Crook .................. E04H 13/006 27/DIG. 1
6,421,890 B1 * 7/2002 Biggar .................. A61G 17/08 220/23.88
6,484,457 B1 * 11/2002 Dudek .................. E04H 13/00 52/141
10,344,497 B1 * 7/2019 Martinez .............. E04H 13/008
D878,003 S * 3/2020 Garcia ........................... D99/17
11,464,699 B1 * 10/2022 Muthusami ............ B65D 53/02
2006/0179624 A1 * 8/2006 Glass .................. A61G 17/007 27/1

(Continued)

FOREIGN PATENT DOCUMENTS

AT 13 291 U1 10/2013
CN 105649398 A 6/2016
CN 205422127 U 8/2016

(Continued)

OTHER PUBLICATIONS

Machine translation for AT13291. Accessed via Espacenet on May 5, 2023.*

(Continued)

*Primary Examiner* — Christine T Cajilig
(74) *Attorney, Agent, or Firm* — Amin, Turocy & Watson, LLP

(57) ABSTRACT

An in-ground niche is disclosed. Example in-ground niches can comprise containers of appropriate size and shape for human or animal cremated remains storage. A portion of an in-ground niche can define an in-ground storage cavity, while another portion thereof can provide a lid support structure for a lid that is positionable on or above ground level. An in-ground niche can also comprise attachment points, both for security bolts to secure the lid to the lid support structure, and for anchor rods to anchor the in-ground niche in the ground.

18 Claims, 6 Drawing Sheets

(56) References Cited

U.S. PATENT DOCUMENTS

2021/0372071 A1* 12/2021 Yoo .......................... E02D 27/50

FOREIGN PATENT DOCUMENTS

| | | | | |
|---|---|---|---|---|
| CN | 210145010 U | 3/2020 | | |
| DE | 29601340 U1 * | 6/1997 | ............. | A61G 17/08 |
| DE | 198 27 820 A1 | 12/1999 | | |

OTHER PUBLICATIONS

International Search Report and Written Opinion received for PCT Application Serial No. PCT/US2022/033465 dated Sep. 14, 2022, 13 pages.
International Preliminary Report on Patentability received for PCT Application Serial No. PCT/US2022/033465 dated Jan. 11, 2024, 8 pages.

* cited by examiner

IN-GROUND NICHE

BACKGROUND

Cremation of human and animal remains is on the rise worldwide, resulting in an increased demand for effective and long-lasting storage of urns and ashes. Storage should be sturdy, long lasting, tamper proof, weatherproof, cost effective, and fault tolerant. One storage option is in-ground. In-ground niches are structures that can be used for in-ground urn storage. There is a need in the industry for improved in-ground niche structures, for example, niches that can provide simple and effective transport and installation, as well as long lasting damage and tamper resistance.

SUMMARY

In-ground niche structures and corresponding methods of manufacture and use are disclosed. An example niche adapted for in-ground deployment can include a storage cavity sidewall that defines an in-ground storage cavity, and an on-ground lid support structure that extends from an upper portion of the storage cavity sidewall. The lid support structure can comprise a lid support floor and lid support sidewalls, wherein the lid support floor can include a storage cavity access opening, and the lid support sidewalls can extend upward from the lid support floor. A convex lip can extend from upper portions of the lid support sidewalls. A lid can be configured to fit over the lid support structure. Furthermore, lid fastener attachment points can be integrated in the lid support sidewalls, and anchor rod attachment points can be integrated in a lower portion of the storage cavity sidewall. Further aspects of the invention are shown in the attached pictures and described below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
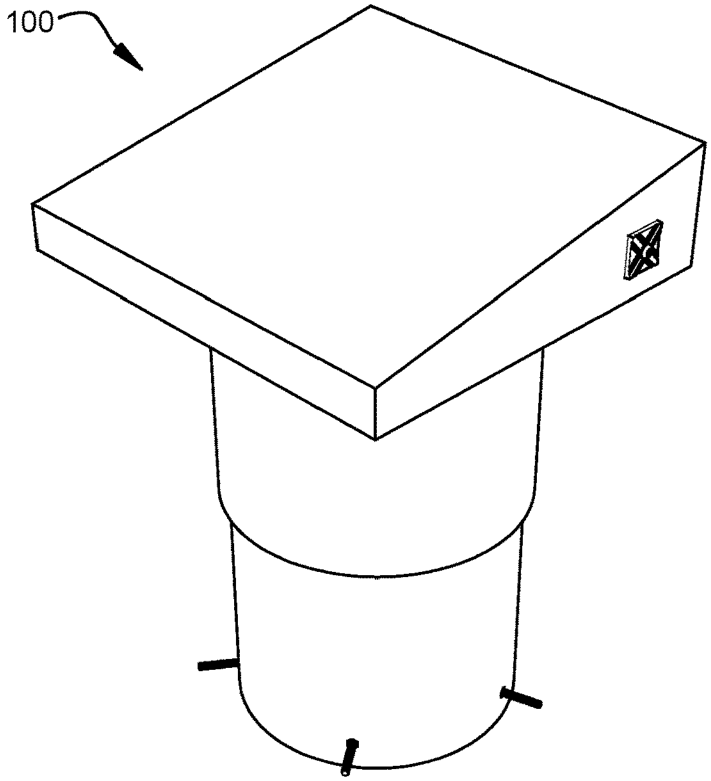
FIG. 1 is a top perspective view of an example double deep in-ground niche.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

A novel niche adapted for in-ground deployment, also referred to herein as an "in-ground niche," is disclosed. Example in-ground niches can comprise containers of appropriate size and shape for urn storage. A portion of an in-ground niche can define an in-ground storage cavity, while another portion thereof can provide a lid support structure for a lid that is positionable on or above ground level. An in-ground niche can also comprise attachment points, both for security bolts to secure the lid to the lid support structure, and for anchor rods to anchor the in-ground niche in the ground.

The drawings accompanying this disclosure generally illustrate two example embodiments, understanding that further embodiments and variations can be made in accordance with this disclosure. The first example embodiment is a double-deep in-ground niche 100, illustrated in FIG. 1-FIG. 12. The second example embodiment is a single-deep in-ground niche 1300, illustrated in FIG. 13-FIG. 20.

Figure 2:
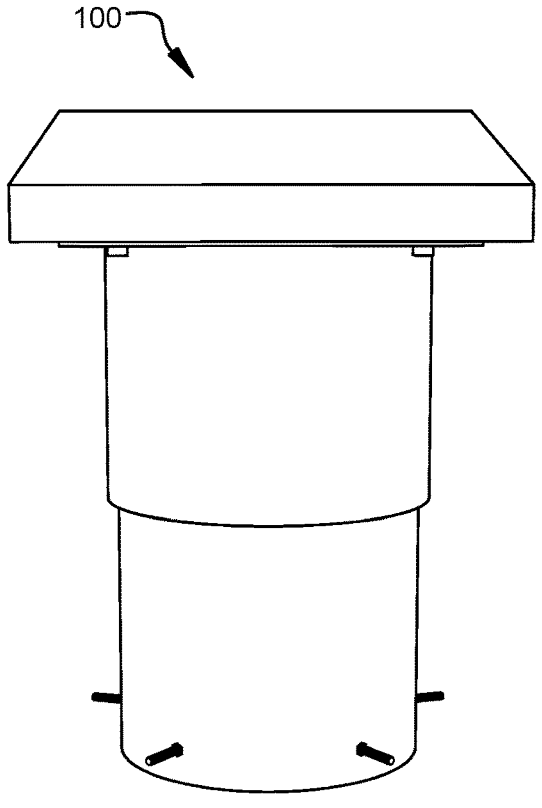
FIG. 2 is a front elevation view of the example double deep in-ground niche.
Figure 3:
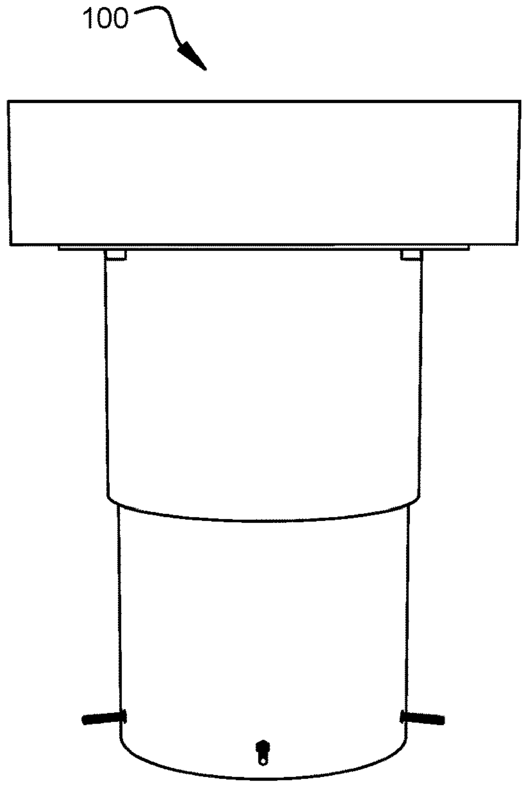
FIG. 3 is a back elevation view of the example double deep in-ground niche.
Figure 4:
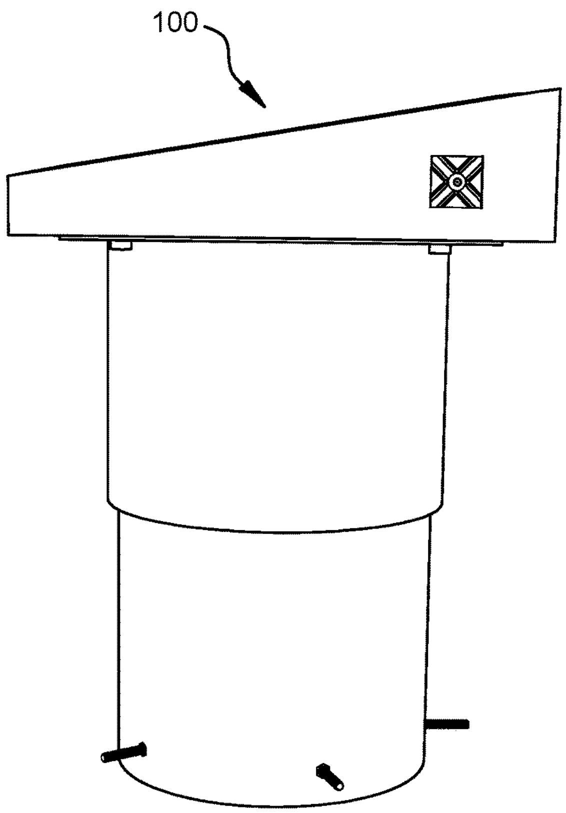
FIG. 4 is a right side elevation view of the example double deep in-ground niche.
Figure 5:
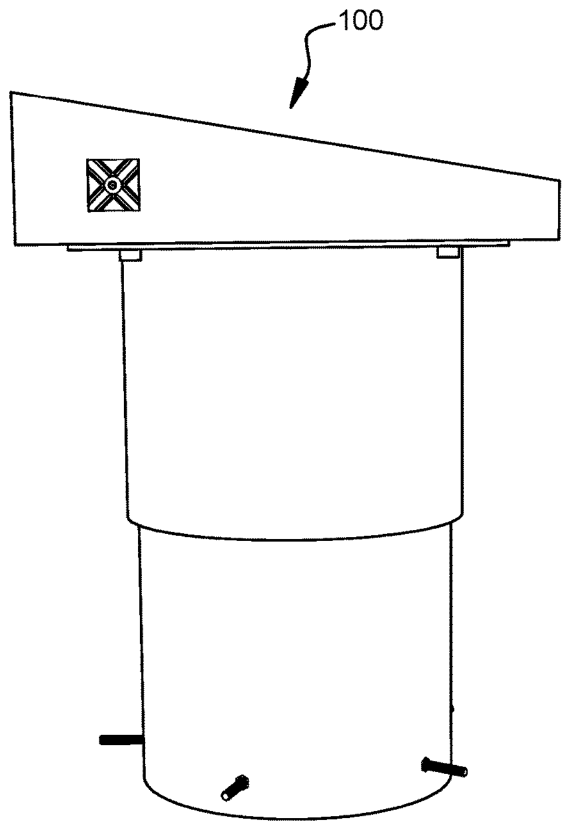
FIG. 5 is a left side elevation view of the example double deep in-ground niche.
Figure 6:
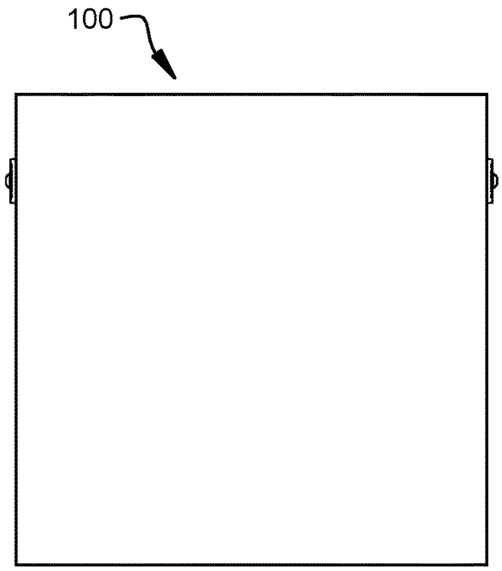
FIG. 6 is a top plan view of the example double deep in-ground niche, wherein a top plan view of an example single deep in-ground niche is identical to FIG. 6.
Figure 7:
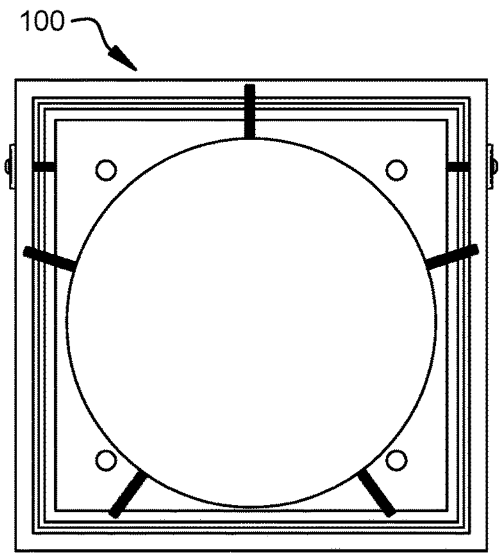
FIG. 7 is a bottom plan view of the example double deep in-ground niche, wherein a bottom plan view of an example single deep in-ground niche is identical to FIG. 7.
Figure 8:
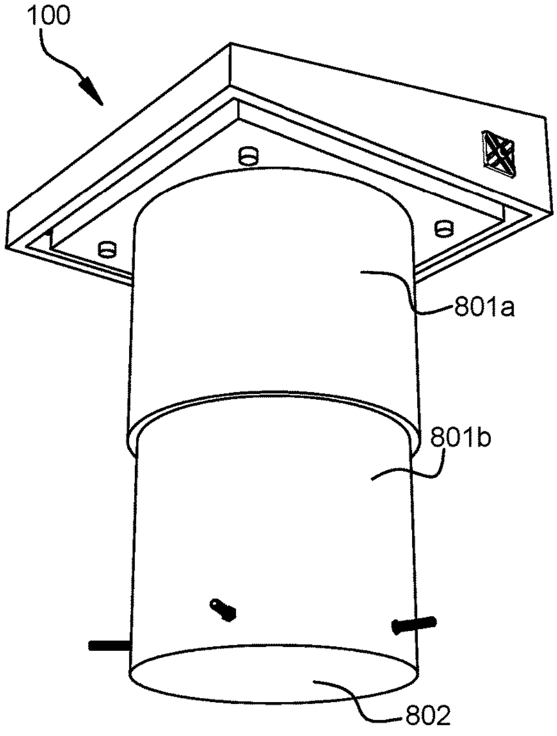
FIG. 8 is a bottom perspective view of the example double deep in-ground niche.
Figure 9:
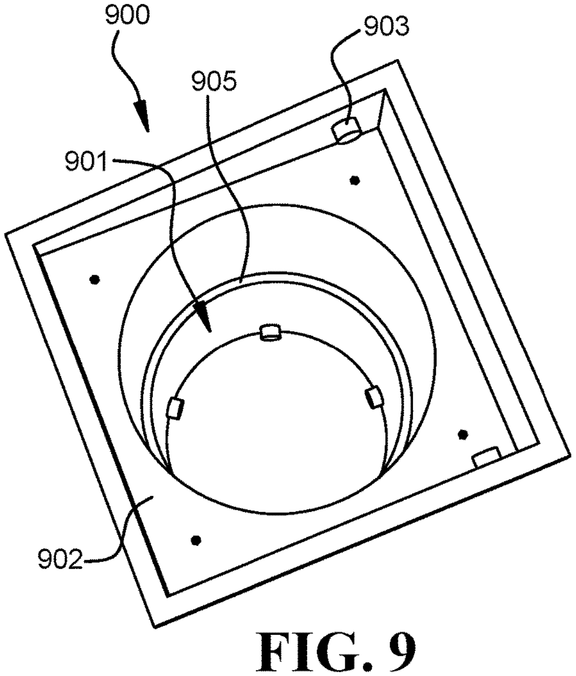
FIG. 9 is a top perspective view with lid removed to show the inside of the example double deep in-ground niche.
Figure 10:
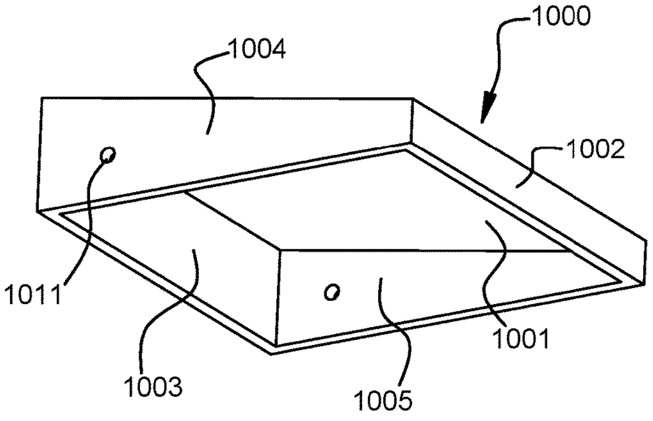
FIG. 10 is a bottom perspective view of an example lid.
Figure 11:
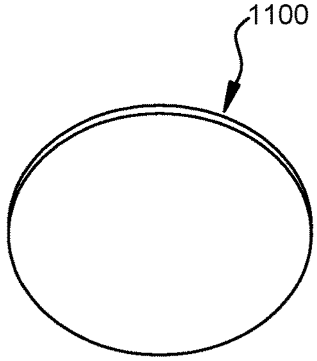
FIG. 11 is a perspective view of an example divider adapted to divide portions of a storage cavity.
Figure 12:
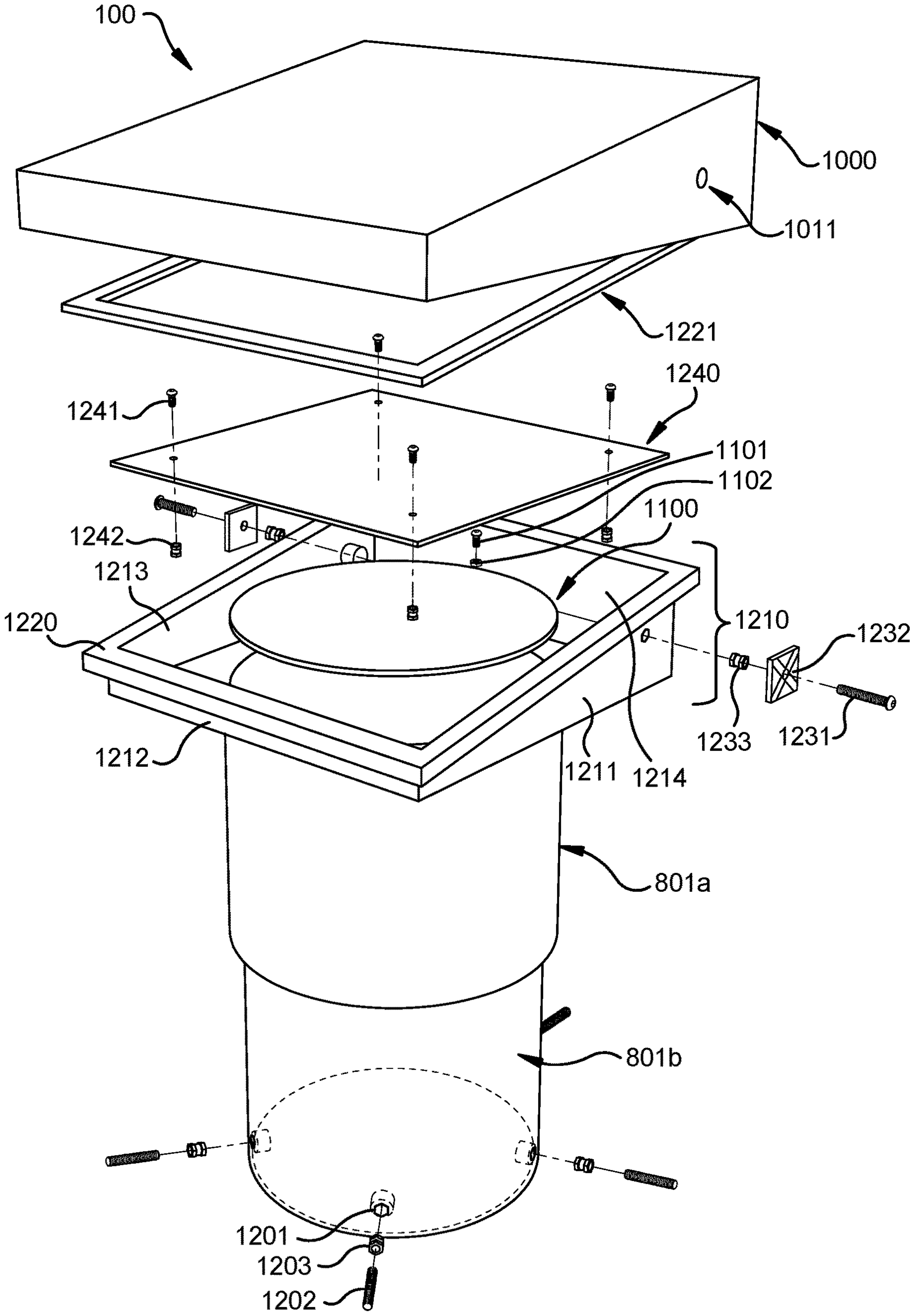
FIG. 12 is an exploded view of the example double deep in-ground niche.

FIG. 1 is a top perspective view of the example double deep in-ground niche 100, FIG. 2 is a front elevation view of the example double deep in-ground niche 100, FIG. 3 is a back elevation view of the example double deep in-ground niche 100, FIG. 4 is a right side elevation view of the example double deep in-ground niche 100, FIG. 5 is a left side elevation view of the example double deep in-ground niche 100, FIG. 6 is a top plan view of the example double deep in-ground niche 100, FIG. 7 is a bottom plan view of the example double deep in-ground niche 100, and FIG. 8 is a bottom perspective view of the example double deep in-ground niche 100. FIG. 9 is a top perspective view with lid removed, to show the inside of a body portion 900 of the example double deep in-ground niche 100. FIG. 10 is a bottom perspective view of an example lid 1000. FIG. 11 is a perspective view of an example divider 1100 adapted to divide portions of an in-ground storage cavity. FIG. 12 is an exploded view of the example double deep in-ground niche 100.

With reference to FIGS. 1-12, the example double deep in-ground niche 100 can be adapted for in-ground deployment. A storage cavity sidewall 801*a*, 801*b*, referred to collectively as storage cavity sidewall 801, can define an in-ground storage cavity 901 therein. A storage cavity floor 802 can be disposed at a lower portion of the in-ground storage cavity 901. In the case of the double-deep in-ground niche 100, the in-ground storage cavities defined by sidewalls 801*a* and 801*b* are adapted for storage of one or more urns each, however, the design can be extended for storage of additional urns.

In the illustrated embodiment, the storage cavity sidewall 801 is cylindrical, however, other shapes such as rectangular, triangular, hexagonal, octagonal, or other polygonal shapes are also feasible. The storage cavity sidewall 801 includes two sections, including a top section 801*a* and a bottom section 801*b*. The bottom section 801*b* is smaller in size than the top section 801*a*, resulting in a shelf 905 inside the in-ground storage cavity 901.

The shelf 905 can support a divider 1100 adapted to divide portions of the in-ground storage cavity 901. The divider 1100 can comprise a removable disk made of transparent acrylic or other sufficiently hard material. The divider 1100 can have a diameter that substantially equals a diameter of the top section 801*a* of the storage cavity sidewall 801. The divider 1100 therefore enables placement of a first urn in the bottom section of the in-ground storage cavity 901, placement of the divider 1100 over the shelf 905, and placement of a second urn atop the divider 1100, in the top section of the in-ground storage cavity 901. The divider 1100 can optionally be fitted with a knob 1101 or other handle or pull fastened thereto. A nut 1102 can secure the knob 1101 to the divider 1100. The knob 1101 can comprise a bolt that extends through a hole in the divider 1100 and into the nut 1102.

An on-ground lid support structure 1210 can extend from an upper portion of the storage cavity sidewall 801. In the illustrated embodiment, the on-ground lid support structure 1210 is rectangular (square), however, other shapes such as circular, triangular, hexagonal, octagonal, or other polygonal shapes are also feasible. In some embodiments, the double deep in-ground niche 100, including the storage cavity sidewall 801 and the on-ground lid support structure 1210, can be molded as a single piece. Alternatively, the storage cavity sidewall 801 and the on-ground lid support structure 1210 can be molded separately and then attached together, e.g., using a watertight glue or fasteners. The storage cavity sidewall 801 and the on-ground lid support structure 1210 can comprise a rotor molded polyethylene material. The thickness of the material can be, e.g., about one-quarter inch.

The on-ground lid support structure 1210 can comprise a lid support floor 902 and lid support sidewalls 1211, 1212, 1213, and 1214. The lid support floor 902 can include a storage cavity access opening, as shown in FIG. 9, to allow access to the in-ground storage cavity 901. The lid support sidewalls 1211, 1212, 1213, and 1214 can extend upward from the lid support floor 902. The lid support sidewalls 1211, 1212, 1213, and 1214 can include a front sidewall 1212 having a lower height than a back sidewall 1214, and side sidewalls 1211, 1213 that slope downwardly from the back sidewall 1214 to the front sidewall 1212.

In some embodiments, a removable inner security cover 1240 can be included, wherein the inner security cover 1240 divides the in-ground storage cavity from a cavity defined by the on-ground lid support structure 1210. The inner security cover 1240 can optionally rest atop the lid support floor 902, and the inner security cover 1240 can optionally have a shape and dimensions that match the lid support floor 902. The inner security cover 1240 can optionally be secured inside the on-ground lid support structure 1210 by fasteners 1241 that fasten to attachment points in the lid support floor 902. The attachment points can comprise, e.g., threaded inserts 1242 affixed inside the lid support floor 902. The fasteners 1241 can comprise bolts that extend through holes in the inner security cover 1240 and into the threaded inserts 1242.

A convex lip 1220 can extend outward from upper portions of the lid support sidewalls 1211, 1212, 1213, and 1214. The convex lip 1220 can be rounded or may have angled edges, e.g., 90 degree angle edges. The convex lip 1220 can surround the full perimeter of the upper portions of the lid support sidewalls 1211, 1212, 1213, and 1214 and can seal against the underside of the lid 1000 to prevent water entry into the in-ground cavity 901.

In some embodiments, a seal 1221 can be included to improve water-tightness of the contact between convex lip 1220 and the lid 1000. The seal 1221 can have a shape and dimensions that matches the convex lip 1220, and the seal 1221 can be made of a water-tight elastic material such as rubber. The seal 1221 can optionally be glued or otherwise fastened on the inner side of the top plate 1001 of the lid 1000, or otherwise, atop the convex lip 1220.

At least one lid fastener attachment point 903 can optionally be integrated in the lid support sidewalls 1211, 1212, 1213, and 1214. The at least one lid fastener attachment point 903 can comprise, for example, a threaded nut 1233. An example lid fastener attachment point 903 can comprise a five-eighths inch long stainless insert with thread size ⅜-16 and thread depth of one-half inch. In-ground niches can further optionally comprise at least one threaded security bolt 1231 configured to extend through a lid 1000 and attach to the at least one lid fastener attachment point 903. An example threaded security bolt 1231 is a three-eighths inch by two and one-half inch hex drive grade 18-8 stainless steel button socket security cap screw. In some embodiments, in-ground niches can optionally comprise two or more lid fastener attachment points. The illustrated embodiment includes two lid fastener attachment points. In-ground niches can further optionally comprise at least one rosette 1232 positionable between the lid 1000 and a head of the security bolt 1231. The illustrated embodiment includes two rosettes 1232. The at least one rosette 1232 can be made of bronze or other hard, long-lasting material.

At least one anchor rod attachment point 1201 can be integrated in a lower portion of the in-ground storage cavity sidewall 801. The at least one anchor rod attachment point 1201 can comprise, for example, a threaded nut 1203, which can be similar or identical to the lid fastener attachment points 903. In-ground niches can further comprise at least one threaded anchor rod 1202 configured to attach to the at least one anchor rod attachment point 1201, e.g., a male threaded anchor rod 1202 can screw into threaded nut type anchor rod attachment points. Anchor rods 1202 can be made of steel or other long lasting and sturdy materials. Anchor rods 1202 can be about two and a half inches in length. An example anchor rode is a three-eighths inch by two and a half-inch zinc finish low carbon fully threaded stud. In some embodiments, in-ground niches can comprise three or more anchor rod attachment points. The illustrated embodiment includes five anchor rod attachment points spaced evenly around the lower portion of the in-ground storage cavity sidewall 801, about one inch from the storage cavity floor 802.

The example double deep in-ground niche 100 can further comprise the lid 1000. The lid 1000 can be configured to fit over the above-ground lid support structure 1210. The lid 1000 can comprise, e.g., a stone or stone composite material, such as granite or marble or various available natural or manmade composite materials. The lid 1000 can comprise a top plate 1001 and four lid sidewalls 1002, 1003, 1004, and 1005 extending downwardly from the top plate 1001, wherein the four lid sidewalls 1002, 1003, 1004, and 1005 can be configured to surround the convex lip 1220 extending from upper portions of the lid support sidewalls 1211, 1212, 1213, and 1214. The top plate 1001 and lid sidewalls 1002, 1003, 1004, and 1005 can be bonded together with an adhesive and/or various available securing hardware, e.g., metal angles, screws or rods. At least one of the lid sidewalls 1002, 1003, 1004, and 1005 can comprise at least one fastener hole 1011 positioned to align with a lid fastener attachment point 903, thereby allowing the threaded security bolt 1231 to extend through the lid 1000 and attach to the at least one lid fastener attachment point 903. The illustrated lid 1000 includes a flat square or otherwise rectangular top plate 1001, however, other shapes are also possible. In some embodiments, a lid 1000 can be of a more natural looking rock shape, which may be made of roto molded polyethylene or injected plastic that can also be configured to fit over the above-ground lid support structure 1210, and can comprise at least one fastener hole positioned to align with a lid fastener attachment point 903, thereby allowing the threaded security bolt 1231 to extend through the lid and attach to the at least one lid fastener attachment point 903.

Dimensions of the example double deep in-ground niche 100 can comprise, e.g., an in-ground storage cavity 901 which is about two feet deep, including a one foot deep top section 801*a* and a one foot deep bottom section 801*b*. The top plate 1001 can have a surface area of about four hundred square inches, e.g., a twenty-one inch by twenty-one inch square. The back sidewall 1214 and back lid sidewall 1003 can be, e.g., about six inches in height, while the front sidewall 1212 and front lid sidewall 1002 can be, e.g., about half the height of the back sidewall 1214 and back lid sidewall 1003. Depending on the size and shape of urns, a double deep in-ground niche 100 which these example dimensions can hold up to five or more urns.

Figure 13:
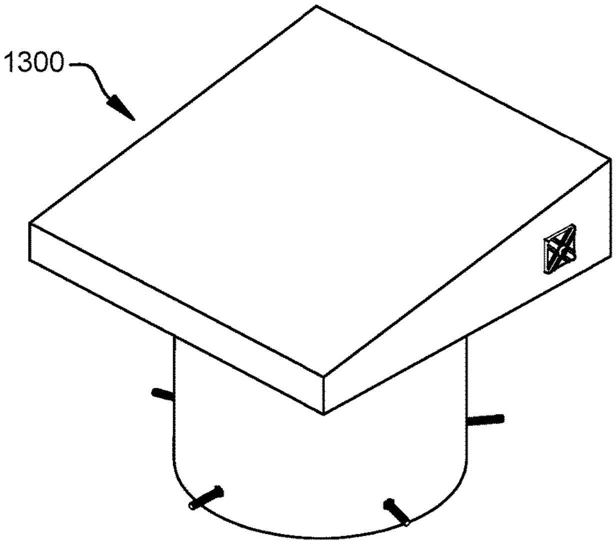
FIG. 13 is a top perspective view of an example single deep in-ground niche.
Figure 14:
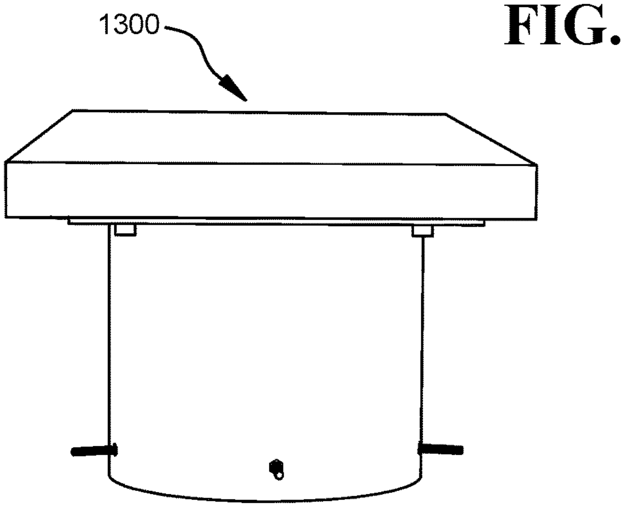
FIG. 14 is a front elevation view of the example single deep in-ground niche.
Figure 15:
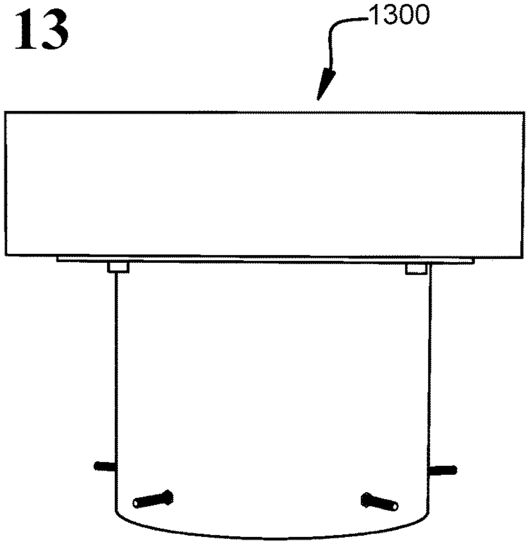
FIG. 15 is a back elevation view of the example single deep in-ground niche.
Figure 16:
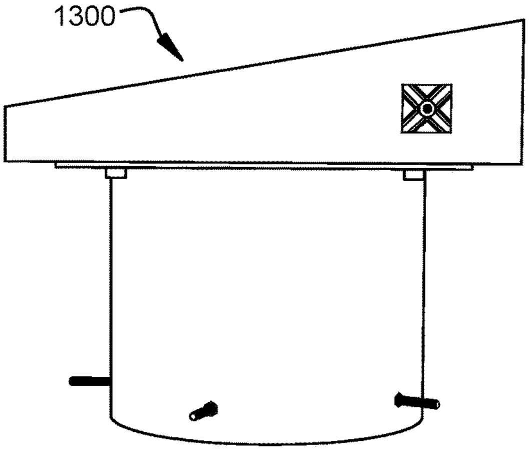
FIG. 16 is a right side elevation view of the example single deep in-ground niche.
Figure 17:
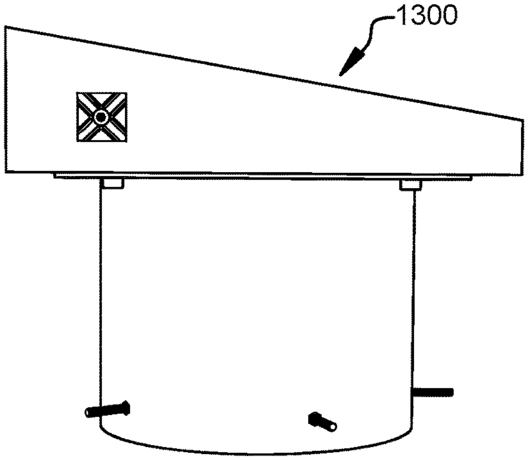
FIG. 17 is a left side elevation view of the example single deep in-ground niche.
Figure 19:
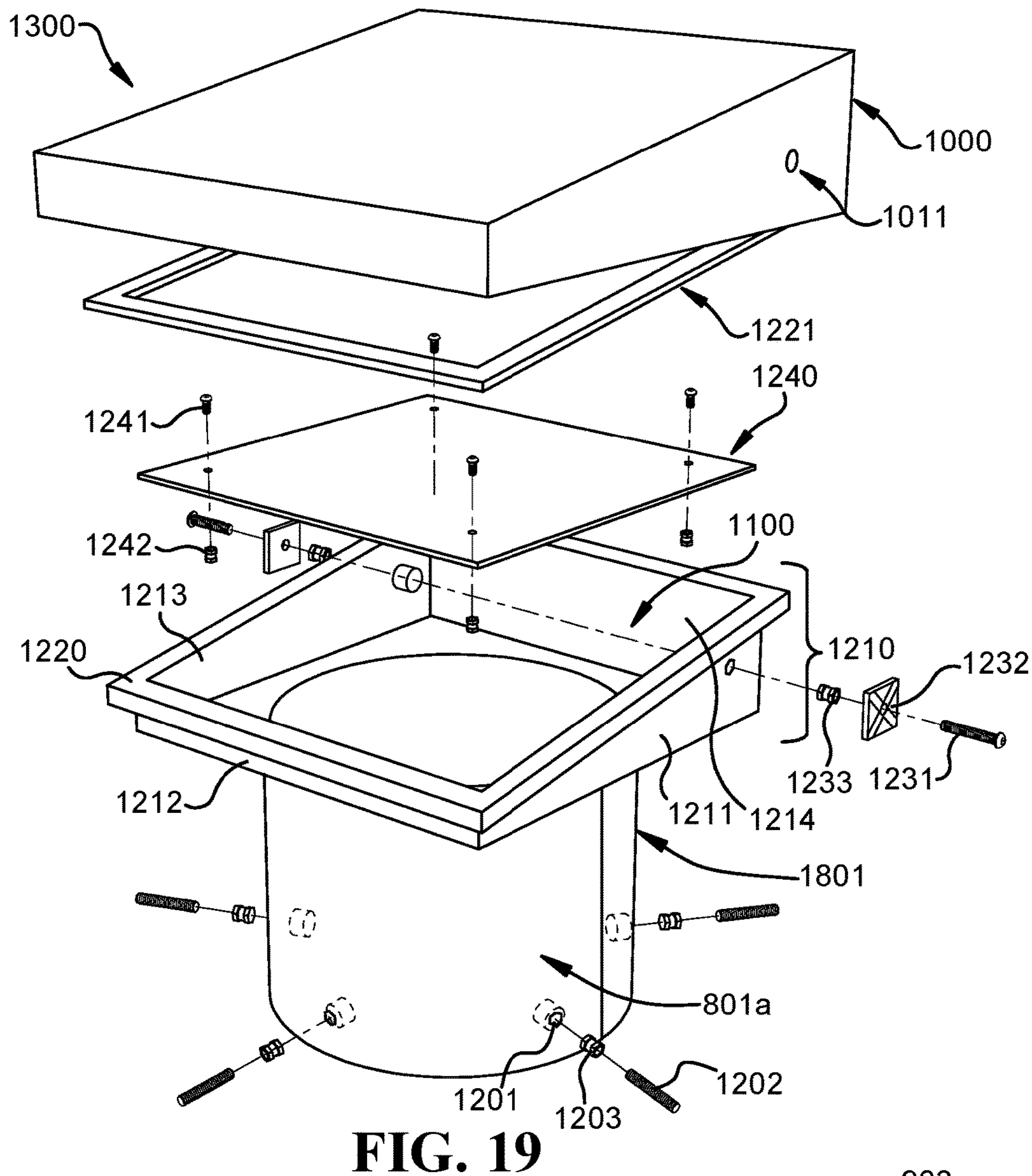
FIG. 19 is an exploded view of the example single deep in-ground niche.
Figure 18:
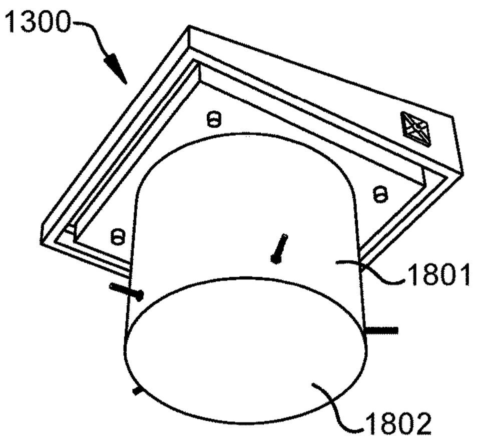
FIG. 18 is a bottom perspective view of the example single deep in-ground niche.
Figure 20:
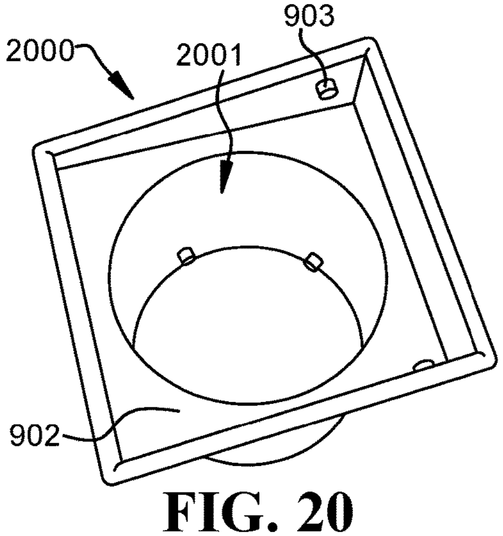
FIG. 20 is a top perspective view with lid removed to show the inside of the example single deep in-ground niche.

An example single-deep in-ground niche 1300 is illustrated in FIG. 13-FIG. 20. FIG. 13 is a top perspective view of the example single deep in-ground niche 1300, FIG. 14 is a front elevation view of the example single deep in-ground niche 1300; FIG. 15 is a back elevation view of the example single deep in-ground niche 1300, FIG. 16 is a right side elevation view of the example single deep in-ground niche 1300, FIG. 17 is a left side elevation view of the example single deep in-ground niche 1300, FIG. 18 is a bottom perspective view of the example single deep in-ground niche 1300, FIG. 19 is an exploded view of the example single deep in-ground niche 1300, and FIG. 20 is a top perspective view with lid removed to show the inside of a body portion 2000 of the example single deep in-ground niche 1300.

With reference to FIGS. 13-20, like the example double deep in-ground niche 100, the single deep in-ground niche 1300 can be adapted for in-ground deployment. The single deep in-ground niche 1300 can include many similar elements as the double deep in-ground niche 100, and like identifiers are used in FIGS. 13-20 to identify like elements introduced in FIGS. 1-12. Generally, the illustrated example single deep in-ground niche 1300 includes all elements of the double deep in-ground niche 100, with the exception of the bottom section 801*b* of the storage cavity sidewall 801, the shelf 905, and the divider 1100.

A storage cavity sidewall 1801 can define an in-ground storage cavity 2001 therein. Storage cavity sidewall 1801 can be similar to the top section 801*a* of the storage cavity sidewall 801 of the double deep in-ground niche 100. A storage cavity floor 1802 can be disposed at a lower portion of the in-ground storage cavity 2001. Storage cavity floor 1802 can be similar to storage cavity floor 802 of the double deep in-ground niche 100, however, storage cavity floor 1802 may have a larger diameter than storage cavity floor 802 of the double deep in-ground niche 100.

In the case of the single-deep in-ground niche 1300, the in-ground storage cavity 2001 can be adapted for storage of a single urn, however, dimensions can be adjusted and depending on the size and shape of urns, a single deep in-ground niche 1300 having the example dimensions such as described herein can hold up to three or more urns. In the illustrated embodiment, the storage cavity sidewall 1801 is cylindrical, however, other shapes such as rectangular, triangular, hexagonal, octagonal, or other polygonal shapes are also feasible.

Dimensions of in-ground niches disclosed herein can be adapted as appropriate. For example, small in-ground niches may be appropriate for storing ashes of pets. An example small in-ground niche can comprise a storage cavity floor 1802 with a diameter of about 4-8 inches, e.g., about 6 inches, a storage cavity sidewall 1801 with a height of about 5-9 inches, e.g., about 7 inches, and a lid 1000 with a length and width of about 10-14 inches each, e.g., about 12 inches each. A front lid sidewall 1002 for such a small lid can have a height of about 1.75-2.75 inches, e.g., about 2.24 inches, and a back lid sidewall 1003 for such a small lid can have a height of about 3.75-4.75 inches, e.g., about 4.31 inches. Of course, numerous size variations are possible and measurements within about +/−50% of those disclosed herein are appropriate for many applications.

The single deep in-ground niche 1300 can include an on-ground lid support structure 1210 comprising a lid support floor 902 and lid support sidewalls 1211, 1212, 1213, and 1214 and a convex lip 1220, as described in connection with FIGS. 1-12. The single deep in-ground niche 1300 can furthermore optionally include at least one lid fastener attachment point 903 including a nut 1233, at least one threaded security bolt 1231, and at least one rosette 1232, as described in connection with FIGS. 1-12. Likewise, the single deep in-ground niche 1300 can include at least one anchor rod attachment point 1201 including a nut 1203 and at least one threaded anchor rod 1202, as described in connection with FIGS. 1-12. The example single deep in-ground niche 1300 can include a lid 1000 such as illustrated in FIG. 10, including the top plate 1001, the four lid sidewalls 1002, 1003, 1004, and 1005, and the at least one fastener hole 1011. The example single deep in-ground niche 1300 can include a seal 1221 and an inner security cover 1240 as described in connection with FIG. 12.

Dimensions of the example single deep in-ground niche 1300 can comprise, e.g., an in-ground storage cavity 2001 which is about one foot deep. The top plate 1001 can have a surface area of about four hundred square inches, e.g., a twenty-one inch by twenty-one inch square. The back sidewall 1214 and back lid sidewall 1003 can be, e.g., about six inches in height. Depending on the size and shape of urns, a single deep in-ground niche 1300 which these example dimensions can potentially hold up to three or more urns.

Installation of in-ground niches such as disclosed herein can comprise, e.g., attaching the anchor rods 1201 to the anchor attachment points 1202, and digging a ground hole of larger dimensions than the in-ground niche. Concrete can be poured into the hole, to a depth of at least four to six inches of concrete. The bottom of the in-ground niche can then be placed in the concrete, submerging the anchor rods several inches under the concrete, and bringing the lid support floor 902 flush with ground level. The in-ground niche can then be adjusted to ensure the storage cavity floor 802 and the lid support floor 902 are level. After optionally waiting for the concrete to harden, the ground hole can then be refilled, surrounding the in-ground niche with dirt or other ground material. For double-deep in ground niches, the divider 1100 can be placed inside the in-ground storage cavity 901. Finally, the lid 1000 can be placed over the lid support structure 1210 and optionally secured in place with the security bolts 1231 and rosettes 1232. The security bolts 1231 can be installed and tightened with a specialized security bit adapted to fit the security bolts 1231.

Manufacturing of in-ground niches such as disclosed herein can comprise, e.g., configuring a mold, such as a rotor mold or an injection mold. In some embodiments, a mold can be adaptable to make both single and double deep embodiments, e.g., by having a removable bottom portion of the mold for bottom section 801*b* and placing a cap to form the single deep storage cavity floor 1802. When the removable bottom portion is removed, the mold will make a single deep embodiment. When the removable bottom portion is restored, the mold will make a double deep embodiment. Attachment points, such as anchor rod attachment points 1201 and security bolt attachment points 903, can be inserted onto appropriate mold structures for holding the attachment points in place during molding. The molding process can then proceed, by pouring, injecting, or otherwise inserting an appropriate volume of polyethylene or other material into the mold, distributing the polyethylene to form sidewalls of uniform thickness, and allowing the polyethylene to harden. The molded body can then be removed from the mold.

Meanwhile, anchor rods 1202, security bolts 1231, and rosettes 1232 can be procured or configured, and the lid 1000 can be configured by cutting a lid material into a top plate 1001 and four lid sidewalls 1002, 1003, 1004, and 1005, optionally engraving the top plate 1001, and bonding the top plate 1001 and four lid sidewalls 1002, 1003, 1004, and 1005 together with a strong adhesive and/or with various available securing hardware, e.g., metal angles, screws and rods. Or manufacturing it of a single piece out of roto molded or injected plastic, or molded out of natural or manmade materials.

While various embodiments have been disclosed herein, other aspects and embodiments will be apparent to those skilled in art.

The invention claimed is:

1. A niche adapted for in-ground deployment, comprising:

a storage cavity sidewall that defines a cylindrical storage cavity, wherein a bottom section of the storage cavity sidewall has a first diameter that is smaller than a second diameter of a top section of the storage cavity sidewall, and a shelf is formed on an inner surface of the storage cavity sidewall along an interface between the top section and the bottom section;

a circular divider configured to rest on the shelf and to divide the cylindrical storage cavity into two portions;

an anchor rod attachment point integrated in a lower portion of the storage cavity sidewall, wherein an anchor rod that is attached to the anchor rod attachment point extends substantially horizontally from the storage cavity sidewall;

an on-ground lid support structure that extends from a top of the storage cavity sidewall, wherein the on-ground lid support structure comprises a lid support floor and lid support sidewalls, a lid fastener attachment point comprising a threaded nut is integrated in a lid support side wall of the lid support sidewalls, the lid support floor comprises a storage cavity access opening, and the lid support sidewalls extend upward from the lid support floor;

a convex lip extending outward from upper portions of the lid support sidewalls;

a lid configured to fit over the on-ground lid support structure;

a threaded security bolt configured to extend through the lid and to attach to the lid fastener attachment point; and a rosette positionable between the lid and a head of the threaded security bolt.

2. The niche of claim 1, wherein the lid comprises a stone or molded plastic material.

3. The niche of claim 1, wherein the lid comprises a top plate and four lid sidewalls extending downwardly from the top plate, and the four lid sidewalls are configured to surround the convex lip extending outward from upper portions of the lid support sidewalls.

4. The niche of claim 3, wherein at least one of the lid sidewalls comprises at least one fastener hole positioned to align with the lid fastener attachment point.

5. The niche of claim 1, further comprising a seal positioned inside the lid.

6. The niche of claim 1, wherein the lid support sidewalls comprise a front sidewall, a back sidewall, and side sidewalls, a first height of the front sidewall is smaller than a second height of the back sidewall, and the side sidewalls slope downwardly from the back sidewall to the front sidewall.

7. The niche of claim 1, further comprising a storage cavity floor disposed at a lower portion of the storage cavity.

8. The niche of claim 1, wherein the niche comprises two or more anchor rod attachment points, including the anchor rod attachment point, and two or more lid fastener attachment points including the lid fastener attachment point.

9. The niche of claim 1, wherein the anchor rod attachment point comprises a threaded nut, and the anchor rod is a threaded anchor rod that is configured to attach to the anchor rod attachment point.

10. The niche of claim 1, wherein the storage cavity sidewall is cylindrical.

11. The niche of claim 1, wherein the on-ground lid support structure is square.

12. The niche of claim 1, wherein the convex lip is rounded.

13. The niche of claim 1, wherein the storage cavity sidewall and the on-ground lid support structure are molded as a single piece.

14. The niche of claim 1, wherein the niche comprises a rotor molded polyethylene material.

15. The niche of claim 1, wherein the in-ground storage cavity is a double deep niche adapted for storage of two or more urns.

16. The niche of claim 1, wherein the circular divider is removable and transparent.

17. The niche of claim 1, wherein the storage cavity is adapted for storage of a single urn.

18. The niche of claim 1, further comprising a removable inner security cover that divides the in-ground storage cavity from a cavity defined by the on-ground lid support structure.

* * * * *